W. M. BURKE.
MACHINE FOR CUTTING UP MEAT AND OTHER SUBSTANCES.
APPLICATION FILED DEC. 4, 1919.

1,328,226.  
Patented Jan. 13, 1920.

Inventor  
William M. Burke.  
by Wilkinson & Giusta  
Attorneys.

UNITED STATES PATENT OFFICE.

WILLIAM MARTIN BURKE, OF LONDON, ENGLAND.

MACHINE FOR CUTTING UP MEAT AND OTHER SUBSTANCES.

1,328,226.  Specification of Letters Patent.  Patented Jan. 13, 1920.

Application filed December 4, 1919. Serial No. 342,402.

*To all whom it may concern:*

Be it known that I, WILLIAM MARTIN BURKE, a subject of the King of England, residing in London, England, have invented certain new and useful Improvements in Machines for Cutting Up Meat and other Substances, of which the following is a specification.

This invention is for improvements in or relating to machines for cutting up meat and other substances, for example vegetable materials, and has for its object to provide a machine wherein the meat, after having passed the cutters, is automatically fed out from the machine.

The cutting-machines at present employed comprise a bowl which rotates about a vertical axis, and cutting knives which dip into the bowl and rotate in a plane perpendicular to the plane of rotation of the bowl. With this machine, the meat, which is placed in the bowl, is repeatedly carried around past the cutting-knives until it is reduced to sufficient fineness, when the machine is emptied by scooping the chopped material out with the hand.

The machine according to the present invention comprises the combination with a feed-hopper, of a drum mounted to rotate about a horizontal axis and having a peripheral channel into which the feed-hopper delivers, and a cutting-device placed at the top of the drum or the delivery-side of the feed-hopper and operating in the channel, the cutting-edges of which device move approximately transversely to the direction of the channel.

With this machine, the meat can be continuously fed in by the feed-hopper and is then carried by the drum past the cutting-device which may comprise one or more rotating knives. A receiving-chute may be provided to enter the channel of the drum on the other side of the cutting-device from that on which the feed-hopper is mounted, so that the meat is delivered on to the same as the drum rotates. A continuous feed and delivery can thus be maintained without having to stop the machine, and the degree of fineness to which the meat is reduced will depend upon the relative speeds of the knives and drum and also the number of knife-sets or the kind of cutting-device employed.

In the accompanying drawings which illustrate one method of carrying out the invention:—

The same letters indicate the same parts in both figures of the drawings.

Figure 1:
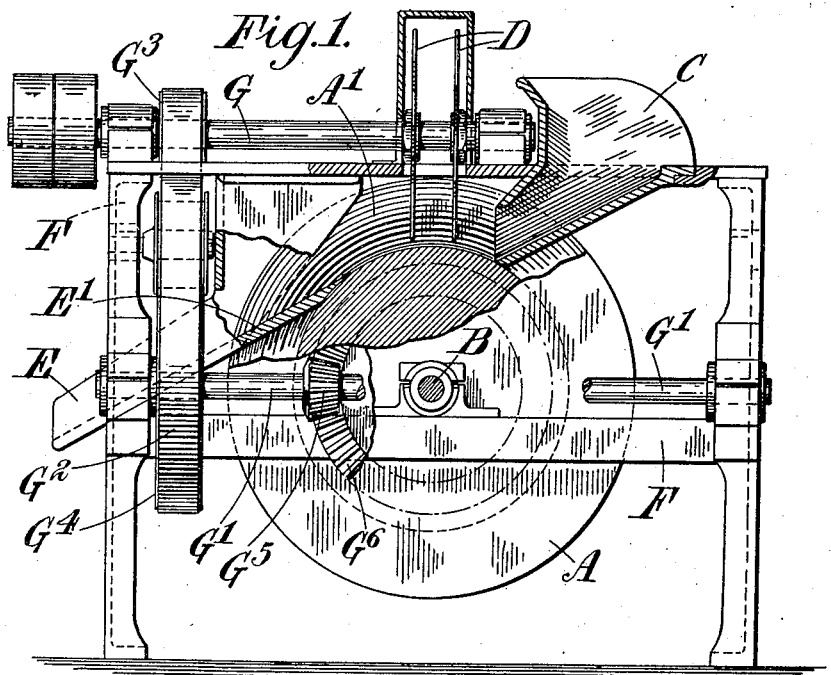
Figure 1 is a side elevation of the machine in part section.
Figure 2:
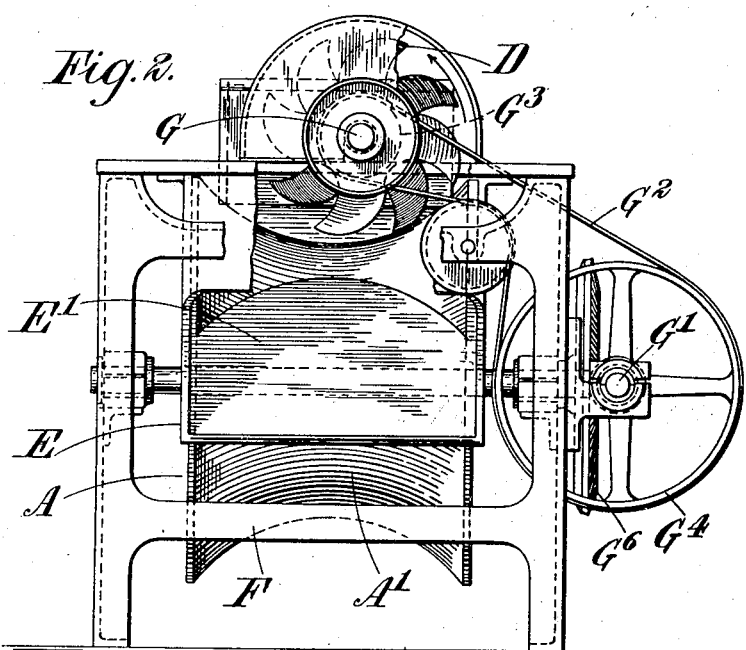
Fig. 2 is an elevation of the machine viewed from the left of Fig. 1.

The drum A is mounted on a horizontal shaft B and has a deep peripheral channel $A^1$, which in cross-section conforms to part of a circle. A feed-hopper C projects into the channel at a point near the top of the drum, and at the top is a cutting-device comprising two sets of cutting-knives D. A receiving-chute E is situated on the opposite side of the cutting-device to that at which the hopper C is mounted and has a tongue $E^1$ which projects into the channel of the drum to receive the material as it is delivered from the cutting-device.

The whole apparatus is mounted in a frame F which carries a driving-shaft G whereon the cutting-knives D are mounted. This shaft drives a second shaft $G^1$ through the medium of a bolt $G^2$ and pulleys $G^3$, $G^4$. The shaft $G^1$ carries a bevel-wheel $G^5$ which meshes with a bevel wheel $G^6$ mounted fast on the shaft B of the drum.

In operation the meat is fed into the hopper C, carried around by the drum A past the cutting-device D, and delivered by the movement of the drum on to the receiving-chute E.

It will be appreciated that any desired form of cutting-device can be employed instead of the knives D, which are only shown by way of example, provided the cutting-edge of such device moves approximately transversely to the direction of the channel $A^1$ and is brought into close proximity with some part of the channel so that the meat is drawn in between the cutting-device and the face of the channel and by this means is cut.

What I claim as my invention and desire to secure by Letters Patent is:—

1. In a machine for cutting up meat and other substances, the combination with a feed-hopper of a drum mounted to rotate about a horizontal axis and having a peripheral channel into which the feed-hopper delivers, and a cutting-device placed at the top of the drum on the delivery-side of the feed-hopper and operating in the channel, the cutting-edges of which device move approximately transversely to the direction of the channel.

2. In a machine for cutting up meat and other substances, the combination with a feed-hopper of a drum mounted to rotate about a horizontal axis and having a peripheral channel into which the feed-hopper delivers, a cutting device placed at the top of the drum on the delivery-side of the feed-hopper and operating in the channel, the cutting-edges of which device move approximately transversely to the direction of the channel, and a receiving-chute which enters the channel of the drum on the other side of the cutting-device to that on which the feed-hopper is situated.

In testimony whereof I affix my signature.

WILLIAM MARTIN BURKE.